July 17, 1962 V. B. STEFFEN 3,044,182
APPARATUS FOR THE STORAGE AND DRYING OF GRAIN
Filed Feb. 18, 1960

INVENTOR
V. B. Steffen
BY
ATTORNEY

United States Patent Office 3,044,182
Patented July 17, 1962

3,044,182
APPARATUS FOR THE STORAGE AND DRYING OF GRAIN
Vincent B. Steffen, Box 268, New Hampton, Iowa
Filed Feb. 18, 1960, Ser. No. 9,549
6 Claims. (Cl. 34—50)

This invention relates to the storage and drying of grain and the like products and to bins and other equipment employed in such drying and which bins will maintain the moisture content of the stored grain or other commodity.

The invention relates especially to storage bins of the type in which means is provided for facilitating the circulation of air and for the heating of the air to dry the same as well as to the structure of the bins to facilitate the filling and emptying of the same and the circulation of the air whether heated or not.

Heretofore, in an effort to obtain equal air flow through a mass of grain contained in circular, rectangular or other shaped structures it has been customary to provide perforated floors. This has involved extra expense in fabrication as well as in the supporting of such floors and has presented problems as well as increased cost in the removal of the grain.

It is an object of the invention to overcome the problems enumerated and to provide a more efficient and less expensive system of storage with uniform ventilation and drying as well as for the distribution of air through a mass of grain and labor-saving mechanism for the removal of the grain from storage.

A further object of the invention is to provide a storage bin having simple and efficient means for heating and circulating and venting and of a construction wherein the air travels the shortest distance and consequently minimum power is required for producing the flow thereof.

Figure 1:
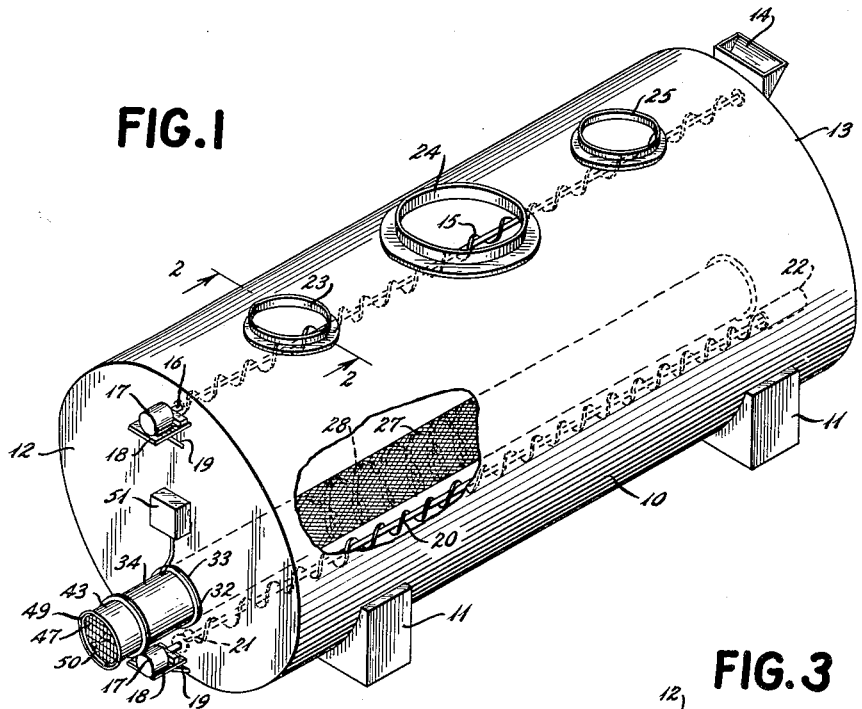
Figure 2:
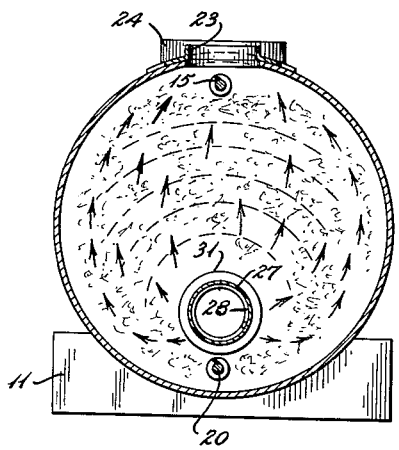
Figure 3:
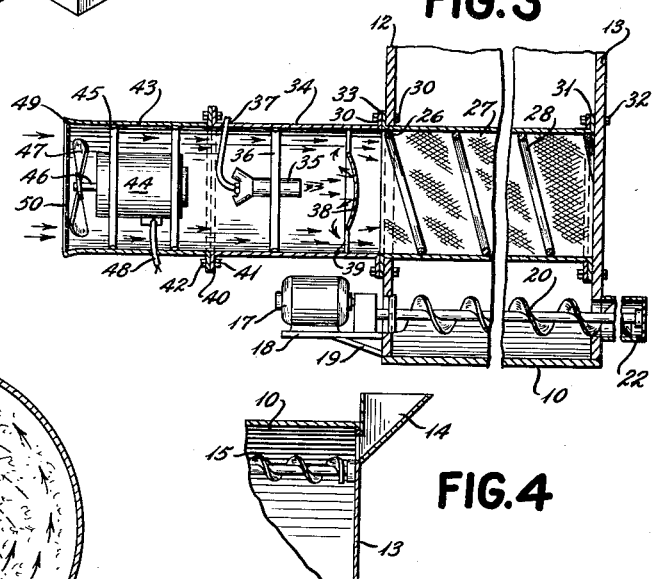

Other objects and advantages of the invention will be apparent from the following description taken in conjunction with the accompanying drawing, wherein:

FIG. 1 is a perspective illustrating one application of the invention;

FIG. 2, a section on the line 2—2 of FIG. 1;

FIG. 3, an enlarged transverse detail section of the heating unit; and

Figure 4:
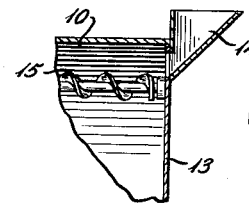

FIG. 4, an enlarged fragmentary detail section on the line 4—4 of FIG. 1.

Briefly stated, a horizontal grain drying and storage container is provided defining a chamber and having a filling hopper or chute at one end and a leveling auger along the top of the container, and with an air exhaust in the top near each end and a larger air exhaust in the center of the top of such container. A conditioning unit is provided in the form of a smaller generally cylindrical horizontally disposed structure extending into the lower portion of the end of the container opposite the hopper and horizontally along the full length of the container, the conditioner includes at its end aligned fan and heater elements and a cylindrical extension within the container in the form of a reticulated screen normally expanded by a helical spring coil so that heated air will be discharged along the length of such conditioning unit near the bottom of the container and with such air passing upwardly and outwardly through the discharge openings at each end and near the top of said chamber. The discharge of the grain from the chamber is by means of a discharge tube along the bottom of the container and with an unloading auger for supplying feed to said discharge tube. The distance which the air must travel through the grain is small with consequent minimum power required for maximum drying of grain. Also there is increased air velocity next to the inside wall of the bin thereby reducing the problem of moisture condensation in the feed next to said wall and the friction load on the side wall is greatly reduced by the circulating drying pattern and design of the structure. Also, the grain at the highest elevation experiences the greatest exposure to high moisture but due to the fact that the volume of grain decreases toward the surface the amount of drying air is increased in this region. Likewise, the pattern of grain movement in emptying the contents results in a blending of the grain giving a uniform final moisture content for storage over long periods and the structure is designed not only for inexpensive, efficient operation but for easy adaptation to mechanical feeding and portability and the cost not only is low because of the absence of perforations but because of the low cost of a foundation for the same.

With continued reference to the drawing, a grain bin is provided having a generally cylindrical wall 10 mounted on a base or foundation 11 adjacent each end of the same, such bin has end walls 12 and 13. The bin is preferably horizontally disposed so that when it is filled with grain drying air may travel the shortest distance.

A hopper or chute 14 is provided for filling the bin with grain and in order to distribute or level the grain within the bin a leveling auger 15 is provided along the top of the bin, such auger extending through an opening 16 in the end 12 and being driven by a motor 17 mounted on a shelf 18 supported by a bracket 19, the shelf or bracket being welded or otherwise attached to the end 12. A similar discharge or unloading auger 20 extends through an opening 21 in the end 12 of the bin, such auger being driven by a second motor 17 mounted on an additional shelf 18 supported by a similar bracket 19 welded or otherwise secured to the end of the bin. At its opposite end the auger 20 extends into an outlet tube 22 for discharging feed therethrough.

In order to allow air to be discharged from the bin circular exhaust openings 23, 24 and 25 are provided, the openings 23 and 25 being adjacent the ends of the top of the bin and the opening 24 being located centrally of the top of the bin. Thus the greatest distance to an exhaust opening is substantially the diameter of the bin or a diagonal line from a point midway between adjacent exhaust openings at the opposite side of the bin to either of the nearer exhaust openings. The advantage of having the bin with its axis in horizontal position is a substantial advantage for if the bin were on end, air would be required to travel a greater distance corresponding to the height of the bin and this would require more power to force air from the top to the bottom of the bin.

In order to aerate and dry the contents of the container or bin, air heating and circulating means is provided through an inlet 26 in the end 12 of the container, such air heating and circulating means comprising a tube of a wire mesh or other structure 27 through which air can readily pass and provided with a supporting helical spring 28 of a length to extend from one end of the cylinder to the other, preferably having a flange 30 at one end and a similar flange 31 at the other end secured to the cylinder ends 12 and 13 by means of bolts or other fasteners 32. The bolts 32 through the end 12 likewise extend through a flange 33 of a heater casing 34 having a burner or heating element 35 mounted on a support 36, the burner being adapted to be supplied with fuel through a tube 37. A baffle or shield 38 is provided disposed in spaced relation to the discharge of the burner, such shield being mounted by means of straps 39 welded or otherwise secured to the casing 34. The heater casing 34 is provided with a flange 40 to which is fastened by means of bolts 41 the flange 42 of a fan casing 43. Within this fan casing is mounted a motor 44 on brackets or supports 45, said motor having a shaft 46 on which is mounted a fan 47, current being supplied through conductors 48. The inlet end of the motor casing is provided with a bell mouth 49 to facilitate the inlet of air and a grill 50 is provided as a safety feature for preventing the admission of portions of the body or other animate and inanimate objects into the fan casing.

In the use of the invention grain or the like to be stored and dried is supplied to the bin through the chute or hopper 14 with a leveling auger 15 serving to insure leveling or movement of the grain lengthwise within the bin forming cylinder. When the bin is full the fan in the heater may be operated to force the heated air lengthwise through the tube 27 where it will be discharged and caused to travel through the grain and be exhausted through the openings 23, 24, 25. Suitable controls such as a humidistat 51 may be employed to control the operation of the heater and blower to maintain the desired amount of moisture in the bin.

In order to unload the hopper all that is necessary is to remove the closure to the discharge tube and to operate the discharge auger.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. The combination of a generally horizontally disposed cylindrical chamber having vent openings spaced along its top, means forming an inlet passage in the upper portion of said chamber and a discharge passage in the lower portion of said chamber, for grain to be stored and dried, a leveling auger along the upper portion of said chamber in operative association with said inlet passage means and a discharge auger along the lower portion of said chamber in operative association with said discharge passage means for moving material within said chamber outwardly through said discharge passage, air circulating means including an open-work tube disposed lengthwise along the lower portion of said chamber for the passage of air relative to said chamber, temperature modifying means operatively associated with said tube, and means for creating movement of air through said tube and the vents of said chamber.

2. The structure of claim 1 including humidistatic means for regulating the moisture content of the air within said chamber.

3. The combination of a generally horizontally disposed elongated chamber of substantially uniform diameter throughout its length, said chamber having vent openings spaced along its top, an inlet passage means in the upper portion of said chamber and a discharge passage means in the lower portion of said chamber, leveling means in operative association with said inlet passage means, an air circulating unit including an open-work tube disposed lengthwise along the lower portion of said chamber for the passage of air relative to said chamber, and air moving and modifying means operatively associated with said tube.

4. The structure of claim 3 including humidistatic means for regulating the moisture content of the air of said chamber.

5. Apparatus for the storage and drying of grain comprising a generally horizontally disposed cylinder, means forming a filling opening in the upper portion of said cylinder and a discharge opening in the lower portion thereof, leveling means along the upper portion and unloading means along the lower portion of the cylinder, means exteriorly of the cylinder for driving said leveling and unloading means, said container having an inlet for air near the lower portion thereof, a wire mesh tube extending from said inlet lengthwise within said chamber through which air can readily pass, and means connected to said inlet for circulating the air through said cylinder, a helical spring extending lengthwise within and supporting said tube.

6. Apparatus for the storage and drying of grain comprising the combination of a generally horizontally disposed storage chamber, means providing a filling opening in its upper portion and a discharge opening in its lower portion, an air modifying and circulating unit including a generally horizontally disposed perforate tube having its openings circumferentially located over a substantial portion of its area, said tube being located lengthwise above the bottom of the lower portion of said storage chamber and centrally of its width for the introduction of air into said chamber, a discharge auger below said tube, and means for circulating air through said tube whereby grain may be contained and subjected to air with controlled moisture content.

References Cited in the file of this patent
UNITED STATES PATENTS

| | | |
|---|---|---|
| 991,679 | Weiss | May 9, 1911 |
| 2,035,716 | Peek | Mar. 31, 1936 |
| 2,299,299 | Bills | Oct. 20, 1942 |
| 2,466,362 | Blake et al. | Apr. 5, 1949 |
| 2,645,991 | Hobson | July 21, 1953 |
| 2,679,114 | Morrison | May 24, 1954 |
| 2,737,878 | Maho | Mar. 13, 1956 |